US007881937B2

(12) United States Patent
Hasan et al.

(10) Patent No.: US 7,881,937 B2
(45) Date of Patent: Feb. 1, 2011

(54) METHOD FOR ANALYZING PATENT CLAIMS

(75) Inventors: Mohammad Hasan, San Jose, CA (US); William Scott Spangler, San Martin, CA (US)

(73) Assignee: International Business Machines Corporation, Armonk, NY (US)

( * ) Notice: Subject to any disclaimer, the term of this patent is extended or adjusted under 35 U.S.C. 154(b) by 897 days.

(21) Appl. No.: 11/756,549

(22) Filed: May 31, 2007

(65) Prior Publication Data

US 2008/0301138 A1 Dec. 4, 2008

(51) Int. Cl.
*G06F 17/27* (2006.01)
*G06Q 50/00* (2006.01)
(52) U.S. Cl. .............................. 704/270; 704/9; 705/310
(58) Field of Classification Search ........................ None
See application file for complete search history.

(56) References Cited

U.S. PATENT DOCUMENTS

| 5,774,833 | A  | * | 6/1998  | Newman ........................ 704/9 |
| 6,571,241 | B1 | * | 5/2003  | Nosohara ........................ 1/1 |
| 2003/0028460 | A1 |   | 2/2003  | Kraemer |
| 2004/0078365 | A1 |   | 4/2004  | Poltorak |
| 2004/0249739 | A1 | * | 12/2004 | Axford ........................ 705/36 |
| 2005/0097093 | A1 |   | 5/2005  | Clarkson |
| 2005/0114168 | A1 | * | 5/2005  | Goldman ........................ 705/1 |
| 2005/0114169 | A1 |   | 5/2005  | Ansari |
| 2006/0031092 | A1 | * | 2/2006  | Cronin ........................ 705/1 |
| 2006/0036635 | A1 |   | 2/2006  | Williams |
| 2010/0005094 | A1 | * | 1/2010  | Poltorak ........................ 707/5 |

FOREIGN PATENT DOCUMENTS

| JP | 11-134363    | 5/1999  |
| JP | 2002-342447  | 11/2002 |
| JP | 2005-332330  | 12/2005 |

OTHER PUBLICATIONS

Shaparenko et al., "Identifying Temporal Patterns and Key Players in Document Collections," IEEE ICDM Workshop on Temporal Data Mining: Algorithms, Theory and Applications, 2005, pp. 165-174, Houston.

(Continued)

*Primary Examiner*—Brian L Albertalli
(74) *Attorney, Agent, or Firm*—Daniel E. Johnson (57) ABSTRACT

A patent evaluation method analyzes key words in the claims and how many patents use those words, to measure the impact of a given patent. For a group of patents in a particular field (e.g., as defined by a patent classification code), the key words can be indexed against the patents having claims in which those key words appear, and in particular with respect to that patent having the earliest reference date (e.g., a publication date such as the date on which the patent issued or any corresponding patent application was published). Output may be presented in the form of a table, which aids in quickly understanding a patent's value compared to other patents in its group. Various visualization and user interaction tools may be employed.

27 Claims, 5 Drawing Sheets

OTHER PUBLICATIONS

Hasan et al., "Assessing Patent Value through Advanced Text Analytics," IBM Research Report, Jan. 2007, pp. A0701-011, RJ10402, IBM, USA.

Sheremetyeva et al., "Generating Patent Claims From Interactive Input," 8th International Workshop of Natural Language Generation, Jun. 1996, pp. 61-70, England.

Tseng et al., "Text Mining for Patent Map Analysis," IACIS Pacific 2005 Conference Proceedings, 2005, 1109-1116, Taiwan.

Wang et al., "Patent Value Measurement by Analytic Hierarchy Process," IAMOT, 2006, pp. 1-12, China.

Sheremetyeva, "Natural Language Analysis of Patent Claims,"ACL Workshop on Patent Corpus Processing, 2003, Spain.

* cited by examiner

| Patent ID | Date | Words | First Used | Difference (in Days) | Support |
|---|---|---|---|---|---|
| 06963637 | 11/8/05 | machine-accessible | 5/6/03 | 917 | 12 |
| 06181781 | 1/30/01 | java | 8/31/99 | 518 | 38 |
| | | applet | 6/22/99 | 588 | 23 |
| | | www | 1/30/01 | 0 | 16 |
| | | hyperlink | 8/25/98 | 889 | 30 |
| 06775651 | 8/10/04 | unsupervised | 8/19/97 | 2548 | 27 |
| | | text-independent | 6/30/98 | 2233 | 19 |
| | | non-enrolled | 11/14/02 | 635 | 4 |
| 06219407 | 4/17/01 | spotting | 2/17/98 | 1155 | 9 |
| | | trained | 8/2/94 | 2450 | 42 |
| 070003083 | 2/21/06 | - | - | - | - |
| 07079632 | 7/18/06 | browse | 3/17/98 | 3045 | 246 |

METHOD FOR ANALYZING PATENT CLAIMS

TECHNICAL FIELD

The invention relates to a method of analyzing the claims of a patent, and more particularly, to a method of assessing the degree to which those claims capture significantly innovative subject matter, relative to the claims of other patents in the same field, thereby permitting patents to be ranked.

BACKGROUND

There is currently much attention being given to patents as intellectual property assets. Patents may be used for either offensive or defensive purposes, and may provide their owner the opportunity to generate licensing revenue. Indeed, some companies generate hundreds of million of dollars each year from patent licensing activity. A strong patent portfolio may give a company a competitive edge in the marketplace and can be helpful when making business deals, such as mergers and acquisitions, and even when marketing products. For this and other reasons, companies and other organizations are filing an increasing number of patent applications every year.

However, the larger an organization's patent portfolio becomes, the more difficult it becomes to maintain and manage it. Firstly, maintenance fees must be paid periodically to the Patent Office to prevent a patent from lapsing. Since certain patents in the portfolio may become obsolete due to changes in the marketplace, technological innovation, and so on, organizations with large portfolios typically employ strategists to periodically assess their portfolios and identify which patents should be maintained and which should be dropped. Secondly, a company may wish to compare a competitor's product line against its own patent portfolio, in order to identify infringing activity. However, searching a patent portfolio to identify key patents can be a time consuming process. For this reason, one goal of a search of a patent portfolio may be to rank some or all of the patents, or possibly to identify a subset of the portfolio that can be regarded as "fundamental patents". Likewise, one company may wish to examine the portfolio of another company to assess that portfolio's strengths and weaknesses, e.g., prior to acquiring that company or entering into a product line in which that company already has a stronghold.

For these reasons alone, effectively managing a patent portfolio can be important activity in today's marketplace, especially for companies with large patent portfolios. Unfortunately, patent portfolio management can be expensive, since teams of lawyers and analysts may be called upon to do detailed analysis, which in the end may still be somewhat subjective. Accordingly, a tool to help automate this analysis would be desirable.

SUMMARY OF THE INVENTION

The various embodiments and implementations of the invention described herein satisfy the forgoing needs and can be used to assess the importance of an individual patent or to rank the relative importance of a collection of patents, both of which can be helpful when assessing one or more patents' licensing value. The invention may also be useful in identifying a small set of patents that are highly innovative relative to other patents in their field. This may be particularly advantageous with respect to software or business method patents, for which the degree of innovation may be otherwise difficult to assess.

The invention advantageously employs information retrieval techniques to examine the text of patent claims. The corresponding patents may then be ranked according to the degree to which their respective claim sets represent significant innovation above and beyond the prior art. For example, a patent may be considered valuable if the subject matter claimed in the patent is relied upon or expanded upon in subsequently filed patents. In preferred embodiments and implementations of the invention, a user may interact in the process to refine the analysis. Innovative visualization tools may also be employed to assist the user in understanding the most important aspects of a patent and its claims.

In a preferred implementation, for each word (or more preferably, for each key word) in the claims of a group of patents, an index or hash table is used to store a record which includes a patent's identifier or id (e.g., the number of the issued patent in whose claim set that word was used), a reference or publication date corresponding to the issued patent (e.g., the patent's priority or filing date, date of issuance, or more preferably the date on which any corresponding patent application was published), and a count related to how many times that word was used in different claim sets in the group (e.g., all the patents having a claim set using that word may be counted, or less preferably, the first patent having such a claim set may be excluded from the count). To rank a given patent, all the words (or more preferably, just the key words) in its claim set are extracted, and then by using the index, the records corresponding to these words are retrieved. The results are presented in a patent rating table, from which a patent's value can be assessed. The method may also be applied to terms, such as noun phrases consisting of more than one word.

The invention may be advantageously integrated with text analysis software, such as a text analysis engine. Thus, data analysis techniques, such as clustering, trend analysis, word analysis, scatter plot visualization, and so on, may also be employed.

One implementation of the invention is a method for use with a given patent having an identifier, a reference date, and a claim set of one or more claims. The method includes building a dictionary of terms for each one of a plurality of categories of patents (with the categories being based on a taxonomy), in which each of the patents in the categories of patents has an identifier, a reference date, and a claim set of one or more claims, and in which each category's dictionary includes terms from the claim sets of the patents in that category. For each term in each category, a date of first usage is identified corresponding to the earliest reference date among patents in that category having a claim set in which that term is used. The given patent is associated with an appropriate one of the categories, and within the claim set of the given patent, at least one particular term is identified that is in the dictionary of the appropriate category. The method includes evaluating said particular term in the given patent associated with the appropriate category by determining the time difference between: a) the reference date of the given patent, and b) the date of first usage for said particular term in the appropriate category.

A preferred implementation of this method includes a step of determining, for each patent in the appropriate category, whether that patent has a claim set that includes the evaluated term. This may be advantageously repeated for additional given patents and then ranking each of the given and the additional patents in view of a) the time difference for the evaluated term and b) the result of the determining step. The taxonomy may be advantageously based on classification codes of a government patent office, and a corpus of patents may be partitioned into the categories of patents used with the method. The evaluating step may be repeated for at least one additional term in the given patent's claim set (or for every term that does not occur in a stop-list of commonly used terms). The method may advantageously further include determining, for each evaluated term except any having a time difference greater than a predetermined length of time, a numerical score related to how many different patents in the appropriate category have a claim set that includes that evaluated term. The dates of first usage may advantageously correspond to issue dates of the patents, priority dates of the patents, and/or most preferably, publication dates of patent application publications corresponding to the patents.

Another implementation of the invention is a method for use with a given patent having a claim set of one or more claims, the given patent having an identifier and a reference date. The method includes building a dictionary of terms for a group of patents, each of the patents having an identifier, a reference date, and a claim set of one or more claims, in which each of the terms occurs in the claim set of at least one of the patents. For each term a date of first usage is identified corresponding to the earliest reference date among patents in the group having a claim set in which that term is used. Within the claim set of the given patent, at least one particular term is identified that is in the dictionary. The method includes evaluating said particular term in the given patent by determining the time difference between a) the reference date of the given patent, and b) the date of first usage for said particular term. The method may further include repeating the evaluating step for every term in the given patent's claim set that does not occur in a stop-list of commonly used terms, or repeating the evaluating step for at least one additional term occurring in the given patent's claim set. For each evaluated term except any having a time difference greater than a predetermined length of time, a numerical score may be determined related to how many different patents in the group have a claim set that includes that evaluated term. The method may then further include constructing a row of a table, in which the row includes the identifier of the given patent, the reference date of the given patent, all of the evaluated terms (excluding any whose time difference is greater than a predetermined length of time and excluding any not occurring in a predetermined number of different patents in the group), and for each evaluated term in the row: i) its date of first usage, ii) its time difference, and iii) a numerical score related to how many different patents in the group have a claim set that includes that evaluated term. Likewise, additional rows corresponding to other additional given patents may be constructed. Also, the method may further include identifying patents in the group having a claim set that includes the evaluated term, and then plotting a histogram of the number of identified patents that issued in each of a plurality of time periods.

Yet another implementation of the invention is a method for use with a group of patents each of which has an identifier, a reference date, and a claim set of one or more claims. The method includes analyzing the claim sets to identify terms appearing in more than a pre-selected percentage of the claim sets, with the identified terms forming a list of common terms (a "stop-list"). The method further includes building a dictionary of terms, each of which appears in at least one claim set but is not one of the common terms, and for each of the terms in the dictionary: i) considering every patent having that term in its claim set to identify which patent has the earliest reference date and ii) for every patent in the group, comparing its reference date with the reference date of the identified patent. The method may further include the step of evaluating a particular term in a given patent's claim set (in which this particular term also appears in the dictionary, and the given patent has an identifier and a reference date); this evaluating step includes determining the time difference between a) the reference date of the given patent, and b) the earliest reference date for said particular term. The method may include determining, for each evaluated term, how many different patents in the group have a claim set that includes that evaluated term. Also, the method may include determining, for each evaluated term except any having a time difference greater than a predetermined length of time, a numerical score related to how many different patents in the group have a claim set that includes that evaluated term.

In other implementations of the invention, there are provided computer-useable media having computer program products thereon for carrying out any of the methods herein.

DETAILED DESCRIPTION OF THE INVENTION

Preferred embodiments and implementations of the invention are directed to evaluating a patent's strategic value by measuring its impact on subsequently filed patents in the field. The innovative contribution expressed by the patent's claims is identified through a process in which terms are extracted from the text of those claims. The claims are the focus of the analysis of this invention, since it is the claims that define the legal metes and bounds of a patent—it is not possible to possible to determine what is protected by a patent from its title, abstract, or description.

A patent claim is written in accordance with certain legal standards. It describes an apparatus by listing its constituent parts and describes a method by listing its method steps (e.g., software-based methods or business methods). Rather than attempting to understand the claim language from a legal perspective (which is an inherently difficult problem from a software standpoint) or the relationship of the claimed subject matter to the marketplace (which involves a large measure of subjectivity), a simplified approach is taken in which an invention, as expressed by its claims, is viewed as a vector of technical terms or words. By viewing text as a collection of key words without linguistic structure, techniques from the domain of text mining can be invoked, thereby avoiding a complex, linguistic-based approach. For example, one text mining approach that may be used is described by U.S. Pat. No. 6,424,971 to Kreulen et al. titled "System and method for interactive classification and analysis of data", which is hereby incorporated by reference.

The invention is best understood in view of a number of premises. Firstly, each new invention typically brings with it technical jargon and key words specific to that invention, that is, it will frequently introduce a set of terms that are important to describing the essence of that invention. For example, if a patent is directed to back-propagation as a neural network based learning technique, the set {neural network, back-propagation, supervised, weight, neuron, weight vector, epoch} can potentially be a set of terms that represents the innovative essence of that patent.

A second premise is that patents appearing early in a technology cycle are more likely to be fundamental, and hence are more likely to be valuable, than patents coming later in the technology cycle. Thus, a key term or word is associated with a higher value invention when that term appears early in the patent literature. Continuing with the previous example, if a given patent uses the term "back-propagation" for the first time in the patent literature, this term would receive a relatively higher weighting during that patent's evaluation. One aspect of the invention is to extract such innovative terms from the patent's claim section, which are then denoted as the "innovation set". For each term in the innovation set of a given patent, an amount of time is calculated equal to the difference between that patent's date of publication (or another appropriate date) and the publication date of the first patent to use that phrase. Thus, if a patent uses a number of terms that are new to its field, it can be regarded as foundational to that field and is entitled to a higher rating. Note that the importance of a particular term may depend on which field the patent is associated with, since the meaning of a term is generally field-dependent.

Since selecting the best terms for the innovation set of a given patent can be difficult, a user selected time-window may be introduced: Of all the potentially important key words or terms in the text of given patent's claims, any term is excluded from the given patent's innovation set if that term appeared in a claim set of one of the group's patents having a reference date that predates the reference date of the given patent by at least a predetermined amount of time (i.e., if the date of first usage of that term is outside the user-selected window). A time window of zero means that terms are only part of a patent's innovation set if they appear for the very first time in that patent; the greater the time window is, the more terms are included in the innovation set.

A third premise is that the more significant an invention is, the more frequently its respective terminology will appear in the patent literature. Specifically, the number of times a term in a patent's claims appears in different patents is taken to be an indication of the significance of that patent's claimed subject matter. However, this number, designated the "support" for that particular term, does not necessarily by itself determine a given patent's significance. For example, if a given patent has been recently published, there can only be a limited number of patents with claim sets using its terminology, even though the subject matter of that patent may be innovative in its own right. Accordingly, as discussed below, the support value may be normalized to account for this.

Thus, in a preferred implementation of the invention, a given patent's value may be estimated by considering terms in that patent's claims, and in particular, how many patents used those terms and when those patents published relative to the given patent's publication date.

Figure 1:
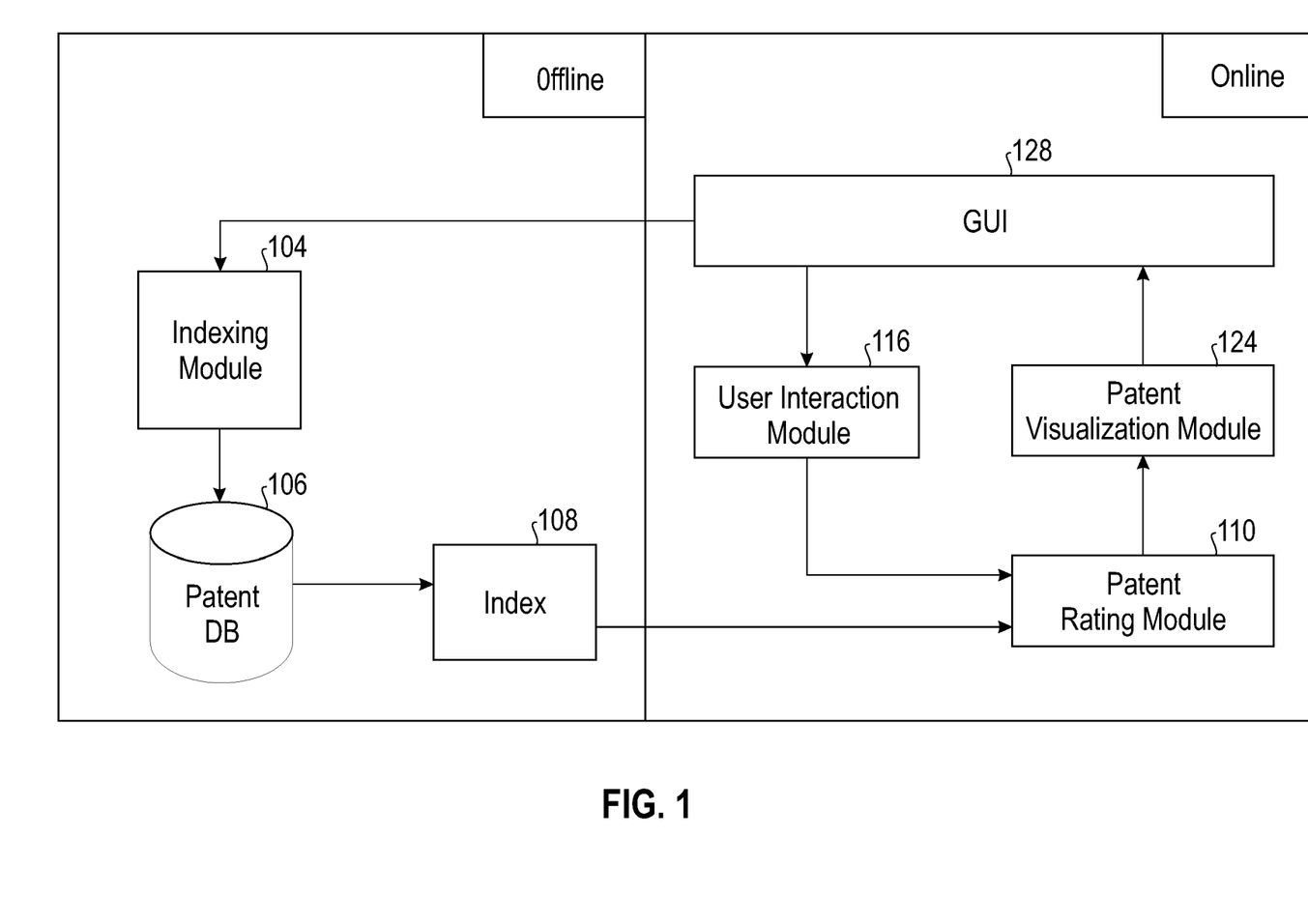
FIG. 1 shows a preferred architecture for implementing the invention.

Details of a preferred implementation of the invention are now described with respect to various software components or "modules" in the block diagram of FIG. 1: a module 104 for indexing the earliest usage of a term; a module 110 for rating a given patent; a user interaction module 116 that interacts with, and facilitates the use of, the rating module 110; and a visualization module 124 for customizing certain output. A graphical user interface 128 may used to interact with the modules 104, 110, 116, and 124, each of which is now considered in turn.

As indicated in FIG. 1, the indexing module 104 may be employed "offline" in a preprocessing phase. The indexing module 104 in effect constructs a dictionary of terms by indexing all the important terms or words in the patents under consideration along with a reference date, such as the date on which a term first appeared in a claim set, e.g., the issue date of the patent or the date on which any corresponding patent application was published. (Other reference dates may also be used, such as the date on which the corresponding patent application was filed.) To distinguish important terms from terms that are ubiquitous, a background dictionary may be relied upon (and constructed, if necessary) that contains stop words and other terms common in the patent literature, terms which should not be important to evaluating a patent (such as the words "the", "said", "and", "or", "a", and so on). For example, if a term appears in more than a pre-selected percentage of the claims sets (e.g., 90%), it may be added to the background dictionary, so that it is not indexed.

The indexing module 104 draws upon a database 106 of patents and published patent applications, such as the one maintained by the United States Patent and Trademark Office, with the output of the module 104 being an index 108 or hash table. This index 108 may advantageously include several pieces of information for each term, such as i) an identifier (e.g., patent number) of the first patent having a claim set in which the term appeared, ii) the issue date of that patent, iii) the publication date of any patent application corresponding to that first patent, and iv) the number of patents having claim sets in which that term was used. It is advantageous to build different indexes for different fields (e.g., technology fields), since the same term may be used in different ways in different fields, and since patents in different fields typically use different terms. Accordingly, patents may be partitioned or assigned to different groups based on a taxonomy, such as the classification codes assigned to those patents by the Patent Office, in which case a separate index file is constructed for each group of patents.

Figure 2:
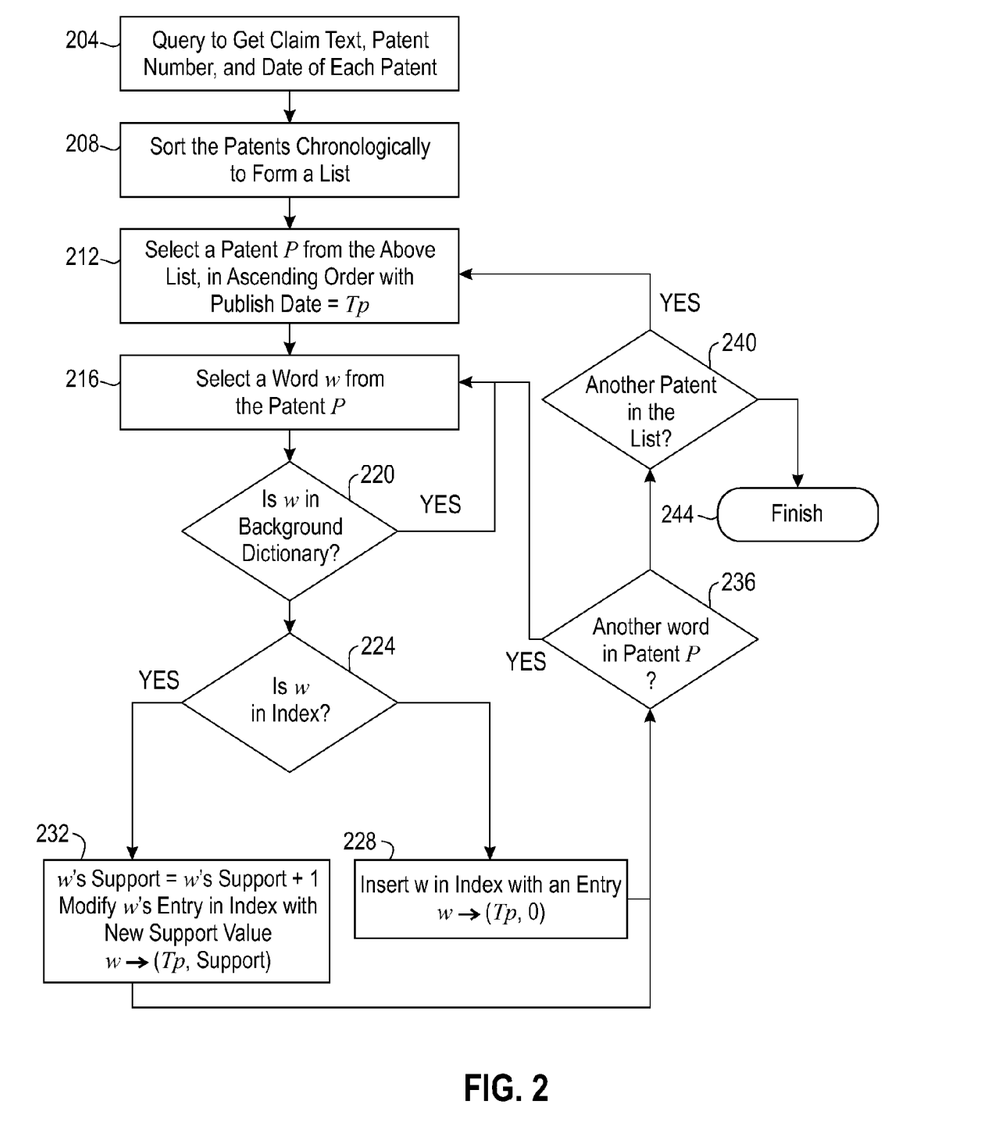
FIG. 2 shows a flowchart for constructing an index of key terms found in the claims of patents of interest.

Various steps used by the indexing module 104 to build an index file for a group of patents in a particular field are now described in more detail with respect to the flow chart shown in FIG. 2. After a query is executed to retrieve the patent identifier or number, reference date (e.g., publication date), and text of the claim set of each patent in the group (step 204), the patents are sorted chronologically, according to publication date (step 208). A patent P from the chronological list (produced in step 208) is then selected (step 212). A word w is then selected from that patent P (step 216), and if w is not in the background dictionary (as determined by step 220) and has not already been added to the index (as determined by step 224), w is added to the index along with the corresponding publication date and patent identifier (step 228). If w is already in the index, a counter that keeps track of how many patents have claim sets in which w appears is increased by one (step 232)—this number is known as the "support" number. The process is repeated if there is another word in patent P to be considered (as determined by step 236). If there is no other word in patent P to be considered (as determined by step 236), and if there is another patent in the group to be considered (as determined by step 240), the next patent is selected and the process is repeated; otherwise, this portion of the method has been completed (step 244) and the file may be saved to a local hard drive, for example. Note that, if desired, it may be advantageous to employ a stemming algorithm to account for synonyms among the terms in the claims sets.

The patent rating module 110 may be used in an "online" or interactive way to determine the relative value of one or more given patents. (The given patent(s) may be selected from the group of patents discussed in connection with FIG. 2, or the given patent(s) may be initially outside this group of patents.

In either case, the given patents(s) are associated with this group of patents.) The module 110 identifies the innovation set of terms described earlier, by automatically extracting important words or terms from the text of the given patent's claims. Information associated with these terms is retrieved, resulting in output like the "patent rating table" 304 shown in FIG. 3. This table 304 displays, in each row, a patent's identifier (e.g., patent number), the corresponding reference date (e.g., the patent's issue date or the publication date of any corresponding patent application), a term extracted from that patent's claim set, the reference date of the first patent to use this term in its claim set (e.g., the first patent's issue date or the publication date of any patent application corresponding to the first patent), the amount of time between these two reference dates, and the number of patents (the "support") having a claim set in which the term appears.

Figure 3:
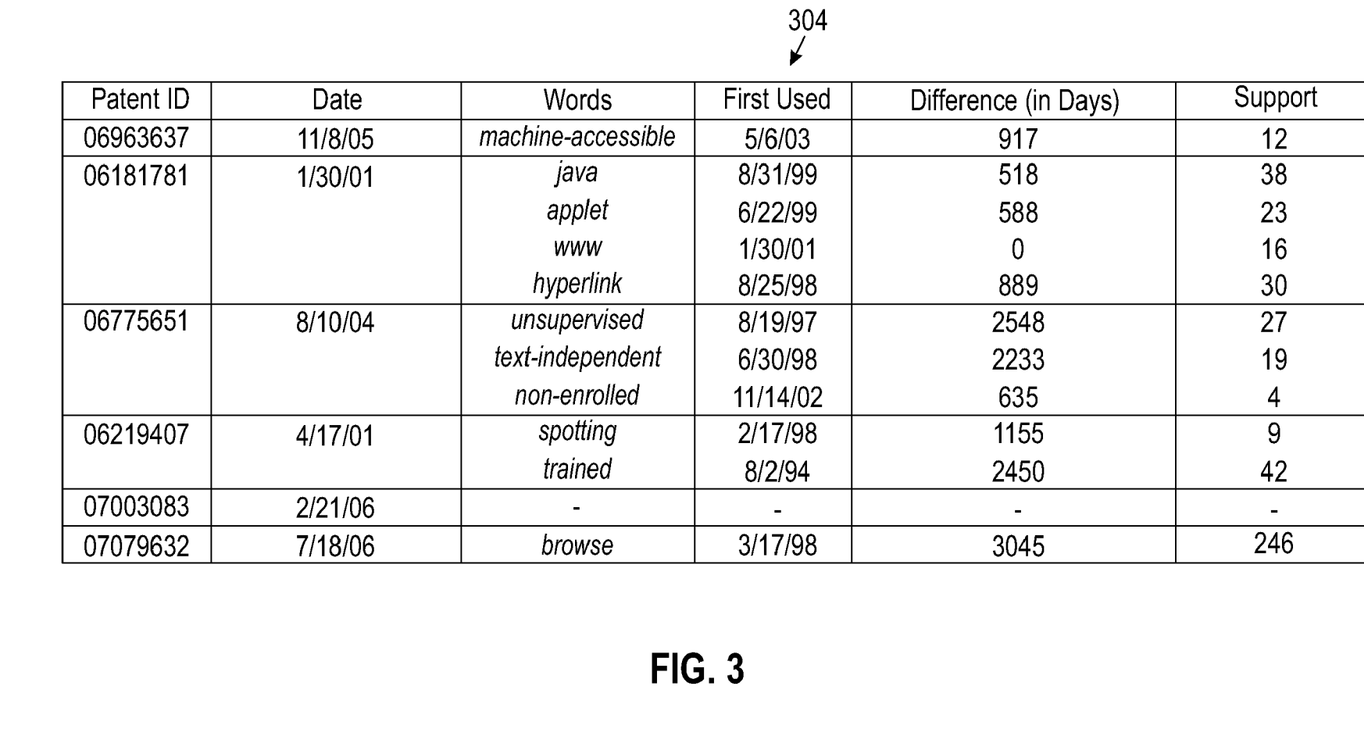
FIG. 3 shows output that can be used for ranking patents.

By way of example, for the patent whose identifier is U.S. Pat. No. 6,181,781, one of the terms is "applet", a term that was first used in a claim set of a patent published Jun. 22,1999, or 588 days prior to the '781 patent. The indicated support of this term is 23, i.e., the term was used in 23 distinct patents in the group of patents under consideration, including the first patent published Jun. 22,1999. Other terms appear in their respective rows in table 304. Patents are considered to be of higher value if they have greater support (see column 6 of table 304); likewise, patents are considered to be of higher value if the terms have smaller amounts of time associated with them (see column 5 of table 304: difference in days). Thus, a measure of a patent's value can be obtained by, for a particular term, normalizing that term's support to its associated amount of time:

$$\text{Patent Value}_{term} = \text{support}_{term}/(\text{difference in days}_{term} + 1) \quad (1)$$

The various Patent Values calculated by equation (1) may then be averaged over all the terms, for example, to obtain an overall Patent Value for a given patent. Note that the data of table 304 can also be used to understand a term's usage over time by plotting a histogram of the number of patents using that term versus time period.

The rating module 110 may advantageously include certain features to enhance the user experience. For example, the module 110 may be flexible enough to permit the rows to be sorted according to values in the columns. Also, the date of first usage in the fourth column of table 304 may be hyperlinked to the corresponding patent for quick reference (e.g., a hyperlink to the appropriate USPTO web site). In addition, the user may specify that the patents in table 304 be related in some way, e.g., they might all fall into a particular technology niche as determined by the presence of one or more key words in the patents or the in the patents' claims.

The user interaction module 116 allows a user, among other things, to alter certain settings in the patent rating module 110, thereby enhancing the method. Thus, a user can add a particular term to the innovation set or delete a term from it. Also, the user may specify that terms have a minimum support count or otherwise be excluded from the table 304 (thereby eliminating misspellings, for example). For example, if the minimum support count is selected to be 20, a term is not considered to be in the innovation set unless that term appears in the claim sets of at least 20 different patents in the group of patents under consideration. Furthermore, the user can choose a time window associated with the innovation set. For example, if the time window is selected to be 4 years, a term will be considered for inclusion in the innovation set of a given patent only if the earliest patent in the group to include that term in its claim set has a reference date that is within 4 years of the reference date of the given patent.

Figure 4:
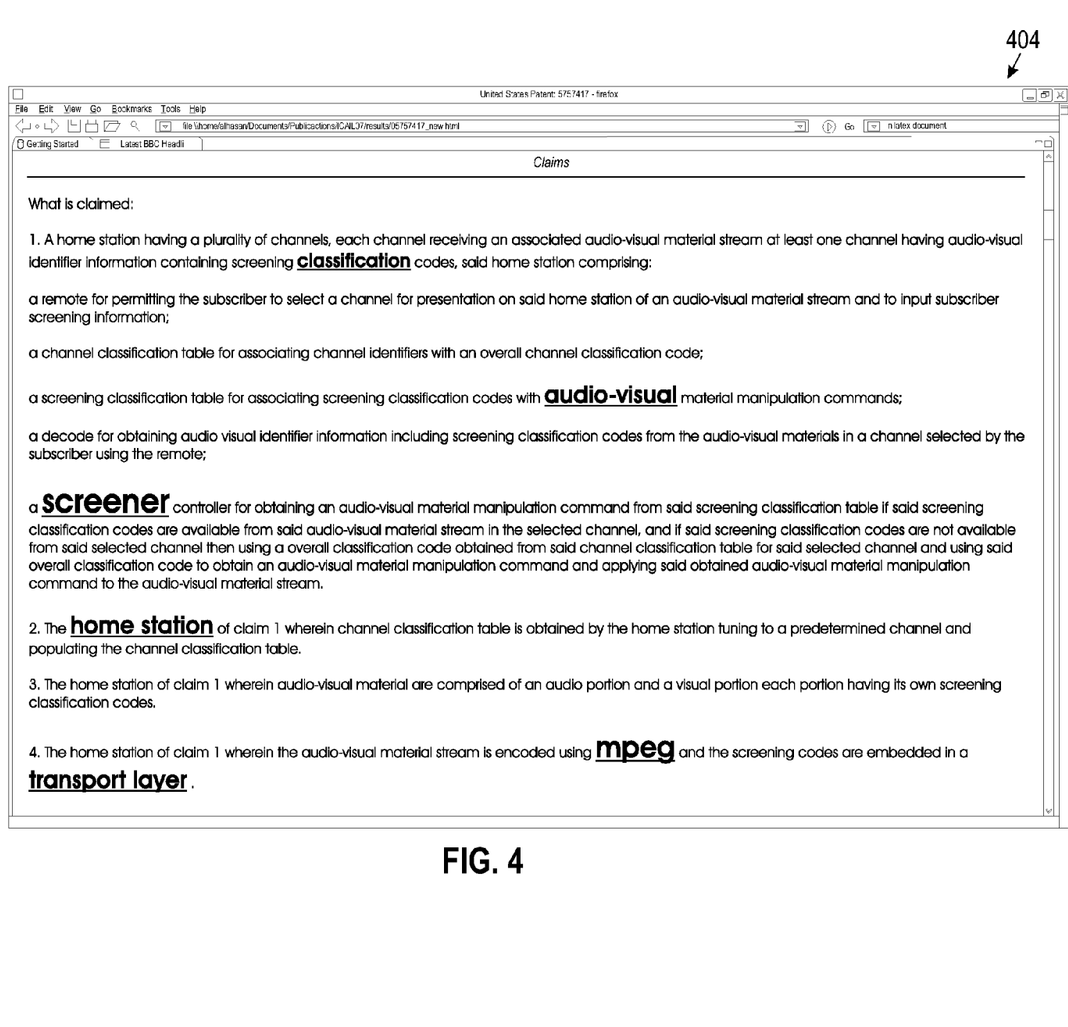
FIG. 4 shows part of a claim set of an exemplary patent, as that claim set appears in the browser's window of a user's machine.

As illustrated by the screen shot 404 of FIG. 4, the visualization module 124 displays text from a patent while highlighting terms in the innovation set, thereby aiding the reviewer of that patent. This highlighting may be advantageously done in the manner shown, by using a font size that is proportional to the importance of the term, e.g., the font size may be inversely proportional to the time difference shown in column 5 of table 304. (Other measures of a term's importance may be invoked, e.g., statistical Natural Language Processing techniques may be brought to bear to understand a claim's linguistic simplicity, generality, degree of ambiguity, and so on.) Also, any term in the innovation set may be presented in a color that is different from other terms in the claim set. In addition, any highlighted term may be hyperlinked to the patent having the first claim set to use that term, among the patents in the group under consideration.

Table 304, especially when used in conjunction with the user interaction module 116 and the visualization module 124, highlights certain advantages of the methods described herein. In particular, these methods give patent analysts the ability to quickly become familiar with a new technology by: exposing them to key terms in a group of patents, providing an indication as to which of those terms are most significant, and bringing to their attention key patents within the group of patents under consideration. In addition, analysts and even patent examiners who wish to understand how the patent literature has changed over time may benefit from these methods.

Figure 5:
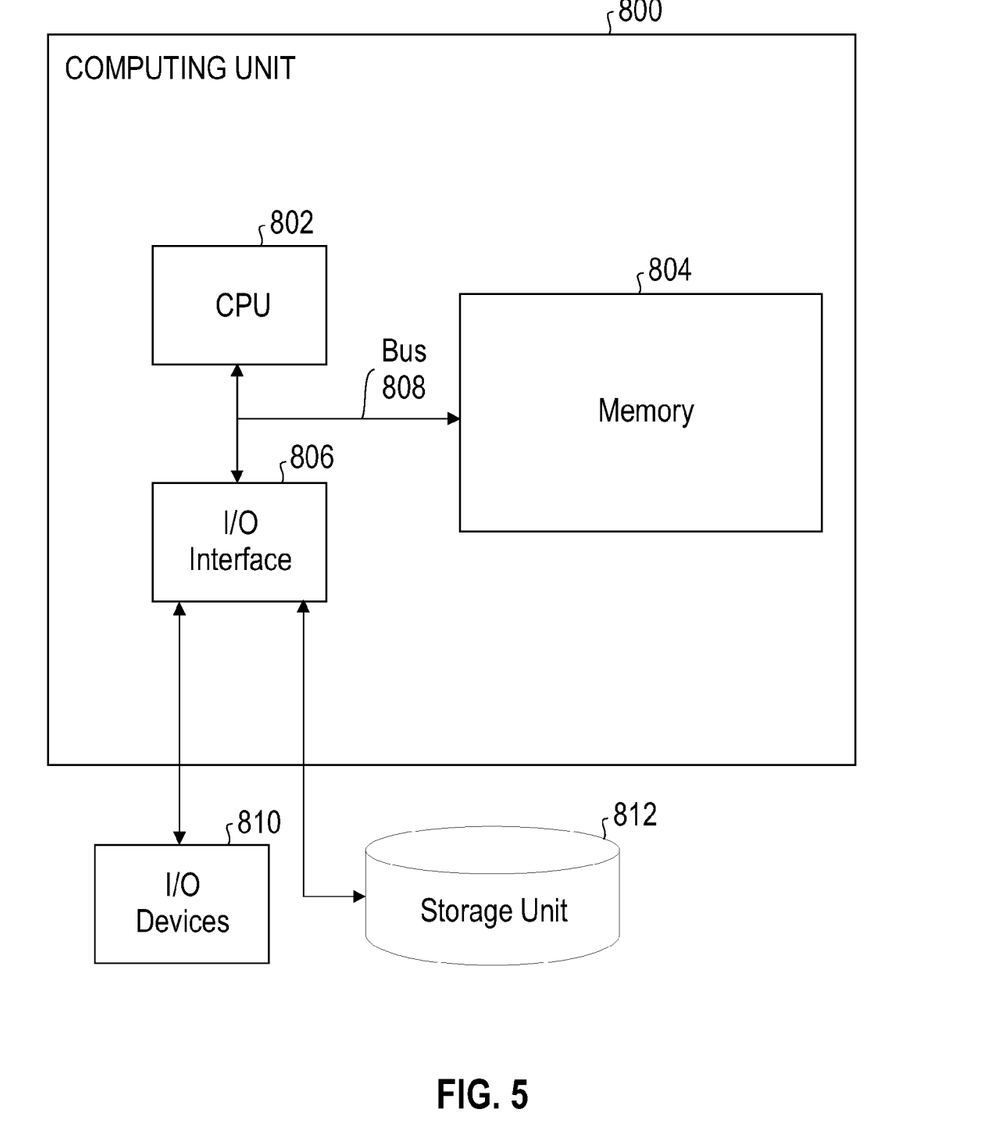
FIG. 5 is a block diagram of a computing unit that may be used in implementing the methods disclosed herein.

FIG. 5 is a block diagram of a computing unit 800 for implementing embodiments of the invention. Computing unit 800 is suitable for storing and/or executing program code directed to implementing the methods disclosed herein, and generally comprises a central processing unit (CPU) 802, a memory 804, an input/output (I/O) interface 806, a bus 808, I/O devices 810 and a storage unit 812. CPU 802 performs computation and control functions of computing unit 800. CPU 802 may comprise a single processing unit, or be distributed across one or more processing units in one or more locations (e.g., on a client and server).

Local memory elements of memory 804 are employed during actual execution of the program code used to implement the methods disclosed herein. Cache memory elements of memory 804 provide temporary storage of at least some program code in order to reduce the number of times code must be retrieved from bulk storage during execution. Further, memory 804 may include other systems not shown in FIG. 5, such as an operating system (e.g., Linux) that runs on CPU 802 and provides control of various components within and/or connected to computing unit 800.

Memory 804 may comprise any known type of data storage and/or transmission media, including bulk storage, magnetic media, optical media, random access memory (RAM), read-only memory (ROM), a data cache, a data object, etc. Storage unit 812 is, for example, a magnetic disk drive or an optical disk drive that stores data. Moreover, like CPU 802, memory 804 may reside at a single physical location, comprising one or more types of data storage, or be distributed across a plurality of physical systems in various forms. Further, memory 804 can include data distributed across, for example, a LAN, WAN or storage area network (SAN) (not shown).

I/O interface 806 comprises any system for exchanging information to or from an external source. I/O devices 810 comprise any known type of external device, including a display monitor, keyboard, mouse, printer, speakers, handheld device, printer, facsimile, etc. Bus 808 provides a communication link between each of the components in computing unit 800, and may comprise any type of transmission link, including electrical, optical, wireless, etc.

I/O interface 806 also allows computing unit 800 to store and retrieve information (e.g., program instructions or data) from an auxiliary storage device (e.g., storage unit 812). The auxiliary storage device may be a non-volatile storage device (e.g., a CD-ROM drive which receives a CD-ROM disk). Computing unit 800 can store and retrieve information from other auxiliary storage devices (not shown), which can include a direct access storage device (DASD) (e.g., hard disk or floppy diskette), a magneto-optical disk drive, a tape drive, or a wireless communication device.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by, or in connection with, a computing unit 800 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 804, ROM, a rigid magnetic disk and an optical disk. Current examples of optical disks include compact disk-read-only memory (CD-ROM), compact disk-read/write (CD-R/W) and DVD.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

The invention may be embodied in other specific forms without departing from its spirit or essential characteristics. The described embodiments are to be considered in all respects only as illustrative and not restrictive. The scope of the invention is therefore indicated by the appended claims rather than by the foregoing description. All changes within the meaning and range of equivalency of the claims are to be embraced within that scope.

What is claimed is:

1. A method for use with a given patent having a claim set of one or more claims, said given patent having an identifier and a reference date, the method comprising:

building a dictionary of terms for each one of a plurality of categories of patents, the categories being based on a taxonomy, each of the patents in the categories of patents having an identifier, a reference date, and a claim set of one or more claims, each category's dictionary including terms from the claim sets of the patents in that category;

identifying, for each term in each category, a date of first usage corresponding to the earliest reference date among patents in that category having a claim set in which that term is used;

using a computer to associate said given patent with an appropriate one of the categories and identifying, within the claim set of said given patent, at least one particular term that is in the dictionary of said appropriate category; and evaluating said particular term in said given patent associated with said appropriate category by determining the time difference between:

a) the reference date of said given patent, and b) the date of first usage for said particular term in said appropriate category.

2. The method of claim 1, further comprising:

determining, for each patent in said appropriate category, whether that patent has a claim set that includes the evaluated term.

3. The method of claim 2, further comprising:

repeating the method of claim 2 for additional given patents and then ranking each of said given and said additional patents in view of a) the time difference for the evaluated term and b) result of said determining step.

4. The method of claim 1, wherein the taxonomy is based on classification codes of a government patent office.

5. The method of claim 1, wherein a corpus of patents is partitioned into the categories.

6. The method of claim 1, further comprising:

repeating said evaluating step for every term in said given patent's claim set that does not occur in a stop-list of commonly used terms.

7. The method of claim 1, further comprising:

repeating said evaluating step for at least one additional term occurring in said given patent's claim set.

8. The method of claim 7, further comprising:

determining, for each evaluated term except any having a time difference greater than a predetermined length of time, a numerical score related to how many different patents in said appropriate category have a claim set that includes that evaluated term.

9. The method of claim 1, wherein the dates of first usage include dates selected from the group consisting of: issue dates of the patents, priority dates of the patents, and publication dates of patent application publications corresponding to the patents.

10. A method for use with a given patent having a claim set of one or more claims, said given patent having an identifier and a reference date, the method comprising:

building a dictionary of terms for a group of patents, each of the patents having an identifier, a reference date, and a claim set of one or more claims, wherein each of the terms occurs in the claim set of at least one of the patents;

identifying for each term a date of first usage corresponding to the earliest reference date among patents in the group having a claim set in which that term is used;

identifying, within the claim set of said given patent, at least one particular term that is in the dictionary; and using a computer to evaluate said particular term in said given patent by determining the time difference between:

a) the reference date of said given patent, and b) the date of first usage for said particular term.

11. The method of claim 10, further comprising:

identifying patents in the group having a claim set that includes the evaluated term; and plotting a histogram of the number of identified patents that issued in each of a plurality of time periods.

12. The method of claim 10, further comprising:
repeating said evaluating step for every term in said given patent's claim set that does not occur in a stop-list of commonly used terms.

13. The method of claim 10, further comprising:
repeating said evaluating step for at least one additional term occurring in said given patent's claim set.

14. The method of claim 13, further comprising:
determining, for each evaluated term, how many different patents in the group have a claim set that includes that evaluated term.

15. The method of claim 13, further comprising:
determining, for each evaluated term except any having a time difference greater than a predetermined length of time, a numerical score related to how many different patents in the group have a claim set that includes that evaluated term.

16. The method of claim 15, further comprising constructing a row of a table, the row including:
the identifier of said given patent,
the reference date of said given patent,
all of the evaluated terms, excluding any whose time difference is greater than a predetermined length of time and excluding any not occurring in a predetermined number of different patents in the group, and
for each evaluated term in the row: i) its date of first usage, ii) its time difference, and iii) a numerical score related to how many different patents in the group have a claim set that includes that evaluated term.

17. The method of claim 16, further comprising:
repeating the method of claim 16 for additional given patents, thereby constructing a table having rows, each row corresponding to a different given patent.

18. The method of claim 10, wherein the dates of first usage include publication dates of patent application publications corresponding to the patents.

19. The method of claim 10, wherein the dates of first usage include dates selected from the group consisting of: issue dates of the patents and priority dates of the patents.

20. A method for use with a group of patents each of which has an identifier, a reference date, and a claim set of one or more claims, the method comprising:
using a computer to analyze the claim sets to identify terms appearing in more than a pre-selected percentage of the claim sets, the identified terms forming a list of common terms;
building a dictionary of terms, each of which appears in at least one claim set but is not one of the common terms; and
for each of the terms in the dictionary: i) considering every patent having that term in its claim set to identify which patent has the earliest reference date; and ii) for every patent in the group, comparing its reference date with the reference date of said identified patent.

21. The method of claim 20, comprising:
evaluating a particular term in a given patent's claim set, said particular term also appearing in the dictionary, said given patent having an identifier and a reference date, wherein said evaluating includes determining the time difference between:
a) the reference date of said given patent, and
b) the earliest reference date for said particular term.

22. The method of claim 21, further comprising:
determining, for each evaluated term, how many different patents in the group have a claim set that includes that evaluated term.

23. The method of claim 21, further comprising:
determining, for each evaluated term except any having a time difference greater than a predetermined length of time, a numerical score related to how many different patents in the group have a claim set that includes that evaluated term.

24. The method of claim 20, wherein the earliest reference dates include dates selected from the group consisting of: issue dates of the patents, priority dates of the patents, and publication dates of patent application publications corresponding to the patents.

25. At least one tangible computer-useable storage medium, said at least one medium having a computer-readable program, wherein the program upon being processed on a computer causes the computer to implement the steps of:
building a dictionary of terms for a group of patents, each of the patents having an identifier, a reference date, and a claim set of one or more claims, wherein each of the terms occurs in the claim set of at least one of the patents;
identifying for each term a date of first usage corresponding to the earliest reference date among patents in the group having a claim set in which that term is used;
identifying, within a claim set of a given patent, at least one particular term that is in the dictionary, said given patent having an identifier and a reference date; and
evaluating said particular term in said given patent by determining the time difference between:
a) the reference date of said given patent, and
b) the date of first usage for said particular term.

26. At least one tangible computer-useable storage medium, said at least one medium having a computer-readable program, wherein the program upon being processed on a computer causes the computer to implement the steps of:
building a dictionary of terms for each one of a plurality of categories of patents, the categories being based on a taxonomy, each of the patents in the categories of patents having an identifier, a reference date, and a claim set of one or more claims, each category's dictionary including terms from the claim sets of the patents in that category;
identifying, for each term in each category, a date of first usage corresponding to the earliest reference date among patents in that category having a claim set in which that term is used;
associating a given patent (having a claim set of one or more claims, an identifier, and a reference date) with an appropriate one of the categories and identifying, within the claim set of said given patent, at least one particular term that is in the dictionary of said appropriate category; and
evaluating said particular term in said given patent associated with said appropriate category by determining the time difference between:
a) the reference date of said given patent, and
b) the date of first usage for said particular term in said appropriate category.

27. At least one tangible computer-useable storage medium for use with a group of patents (each of which has an identifier, a reference date, and a claim set of one or more claims), said at least one medium having a computer-readable program, wherein the program upon being processed on a computer causes the computer to implement the steps of:

analyzing the claim sets to identify terms appearing in more than a pre-selected percentage of the claim sets, the identified terms forming a list of common terms;

building a dictionary of terms, each of which appears in at least one claim set but is not one of the common terms; and for each of the terms in the dictionary: i) considering every patent having that term in its claim set to identify which patent has the earliest reference date; and ii) for every patent in the group, comparing its reference date with the reference date of said identified patent.

* * * * *